United States Patent [19]
Ashley et al.

[11] Patent Number: 6,043,629
[45] Date of Patent: Mar. 28, 2000

[54] MODULAR CONTROL ELECTRONICS FOR BATTERIES

[75] Inventors: Christopher R. Ashley; Craig H. Becker-Irvin, both of Redondo Beach, Calif.

[73] Assignee: Hughes Electronics Corporation, El Segundo, Calif.

[21] Appl. No.: 09/185,239

[22] Filed: Nov. 3, 1998

[51] Int. Cl.⁷ .............................. H01M 10/44; H02M 7/00
[52] U.S. Cl. ........................ 320/119; 320/132; 320/128; 363/65
[58] Field of Search ................................. 320/127, 128, 320/132, 136, 135, 118, 119; 363/60, 65, 71, 59; 361/84, 18, 82, 92

[56] References Cited

U.S. PATENT DOCUMENTS

| | | | |
|---|---|---|---|
| 3,816,804 | 6/1974 | Cardwell, Jr. ........................... | 320/102 |
| 4,736,151 | 4/1988 | Dishner ................................... | 323/224 |
| 5,422,558 | 6/1995 | Stewart ................................... | 320/120 |
| 5,703,464 | 12/1997 | Karunasiri et al. ..................... | 320/125 |
| 5,886,503 | 3/1999 | McAndrews et al. .................. | 320/121 |

OTHER PUBLICATIONS

V.L. Teofilo et al., "Advanced Lithium Ion Battery Charger," IEEE publication 0–7803–3631–3/97, pp. 227–231 (1997).

*Primary Examiner*—Peter S. Wong
*Assistant Examiner*—Gregory J. Toatley, Jr.
*Attorney, Agent, or Firm*—Georgann S. Grunebach; M. W. Sales

[57] ABSTRACT

A power system includes at least two battery cell modules. Each battery cell module has a lithium-ion battery cell, and a battery cell controller operably connected to the lithium-ion battery to control the charging and discharging of the lithium-ion battery cell. A central charge/discharge controller is operably connected to each of the battery cell controllers, allowing the charging and discharging of each lithium-ion battery cell to be individually controlled.

22 Claims, 5 Drawing Sheets

MODULAR CONTROL ELECTRONICS FOR BATTERIES

BACKGROUND OF THE INVENTION

This invention relates to the charging/discharging control of lithium-ion batteries, and, more particularly, to an approach that protects the batteries and optimizes their performance.

Spacecraft such as geosynchronous communications satellites consume large amounts of power in the amplifiers and other electronics that relay signals from point to point on the earth's surface. The power is normally generated by solar cells which produce power only when sunlight is incident upon the solar cells and do not generate power when the satellite is in the earth's shadow. A battery system with rechargeable cells is therefore provided onboard the spacecraft to receive and store excess power generated by the solar cells when the spacecraft is in sunlight, and to deliver that power to the power-consuming components when the spacecraft is in shadow.

Rechargeable cells or batteries are electrochemical energy storage devices for storing and retaining an electrical charge and later delivering that charge as useful power, and which may then be recharged. Familiar examples of the rechargeable energy storage cell are the lead-acid cell used in automobiles, and the nickel-cadmium cell used in various portable electronic devices. The weight of the spacecraft energy storage cell must be minimized while achieving the required performance level, due to the cost of lifting weight to earth orbit and beyond. A battery having even greater performance per unit weight is the lithium-ion battery.

A typical lithium ion battery cell includes a negative electrode, a positive electrode, a separator between the negative electrode and the positive electrode, an electrolyte that saturates the separator and provides a lithium ion path between the negative electrode and the positive electrode, a negative current collector contacting the negative electrode, and a positive current collector contacting the positive electrode. The negative electrode includes a negative-electrode active material that releases lithium ions upon discharging of the battery cell and absorbs lithium ions upon charging of the battery cell. The positive electrode includes a positive-electrode active material that reacts with lithium ions upon discharging of the battery cell and releases lithium ions upon charging of the battery cell. A lithium-ion battery typically employs a number of individual battery cells electrically interconnected in series or parallel arrangements to deliver the required voltage and current for the spacecraft.

Although the rechargeable lithium-ion battery has a great capacity to store electrical charge, it is relatively easily damaged in an electrical sense. For example, overcharging the battery may lead to oxidation and decomposition of the electrolyte, and over-discharging of the battery may cause a change in the physical structure of the negative cathode. Recognizing this problem, a number of battery controllers and controller strategies have been developed to implement the charging and discharging of the lithium-ion batteries. While operable to some degree, these existing approaches require large numbers of components that add considerable weight to the spacecraft. They do not achieve an optimum charging and discharging cycle, and are lacking in some elements of control.

There is a need for an improved approach to the controlling of lithium-ion batteries, particularly those intended for spacecraft applications where the weight of the system must be minimized. The present invention fulfills this need, and further provides related advantages.

SUMMARY OF THE INVENTION

The present invention provides a power system utilizing a number of lithium-ion battery cells. The power system achieves effective control over the charging and discharging of each of the cells, protecting each cell against damage from overcharging and overdischarging. The approach does not require the use of high-current power switches for battery cell bypass. Power is more effectively utilized during the taper charge period of cell charging than in existing systems. The battery cells are decoupled from the regulated power bus, protecting them from damage due to events occurring in the power bus. Instrumentation of the power system is also readily achieved, an important benefit for spacecraft power systems.

In accordance with the invention, a power system comprises at least two, and preferably a plurality of, battery cell modules. Each battery cell module includes a battery cell, preferably a lithium ion battery cell, and a battery cell controller operably connected to the battery to control the charging and discharging of the battery cell. A central charge/discharge controller is operably connected to each of the battery cell controllers of the at least two battery cell modules. The power system also typically includes, for spacecraft applications, a power bus to which each of the battery cell controllers is operably connected, a power source controllably connected to the power bus,-and a power-consuming device controllably connected to the power bus.

The battery cell controllers preferably utilize at least one dc-to-dc power converter. The dc-to-dc converter may be, for example, a dc-to-dc bidirectional power converter or two dc-to-dc unidirectional power converters. These power converters electrically isolate the battery cells from the regulated power bus, protecting the batteries and allowing their more flexible application.

In a preferred application, power is stored and supplied by the power system of the invention. In the preferred approach, each battery cell is charged through its respective battery cell controller under the control of the central charge/discharge controller at a controlled current until a preselected voltage is reached across the battery cell. Thereafter during charging the preselected voltage is maintained and the battery cell is charged with a decreasing current. When at a later time power is to be delivered, each battery cell is discharged through its respective battery cell controller under the control of the central charge/discharge controller. In both charging and discharging, the modular construction, having a respective controller for each battery cell, allows individual battery cells to be charged or discharged while protecting the battery cells against overcharge and over-discharge.

The present invention thus provides a controller for charging and discharging the individual cells of a lithium-ion battery in a highly controlled manner, which is efficient in both weight and power utilization. The batteries are isolated from the power bus. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
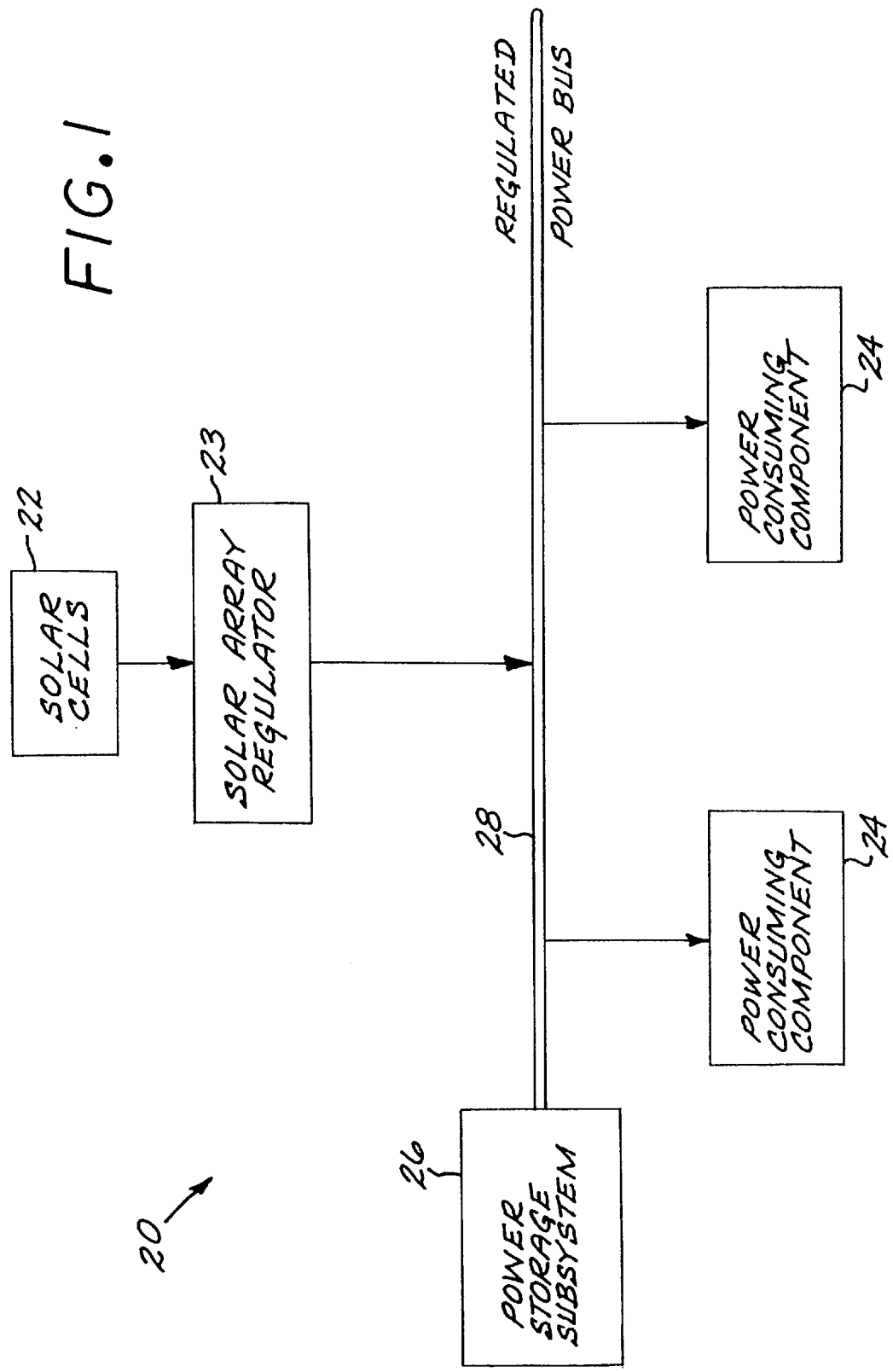
FIG. 1 is a diagrammatic depiction of a power system.
Figure 2:
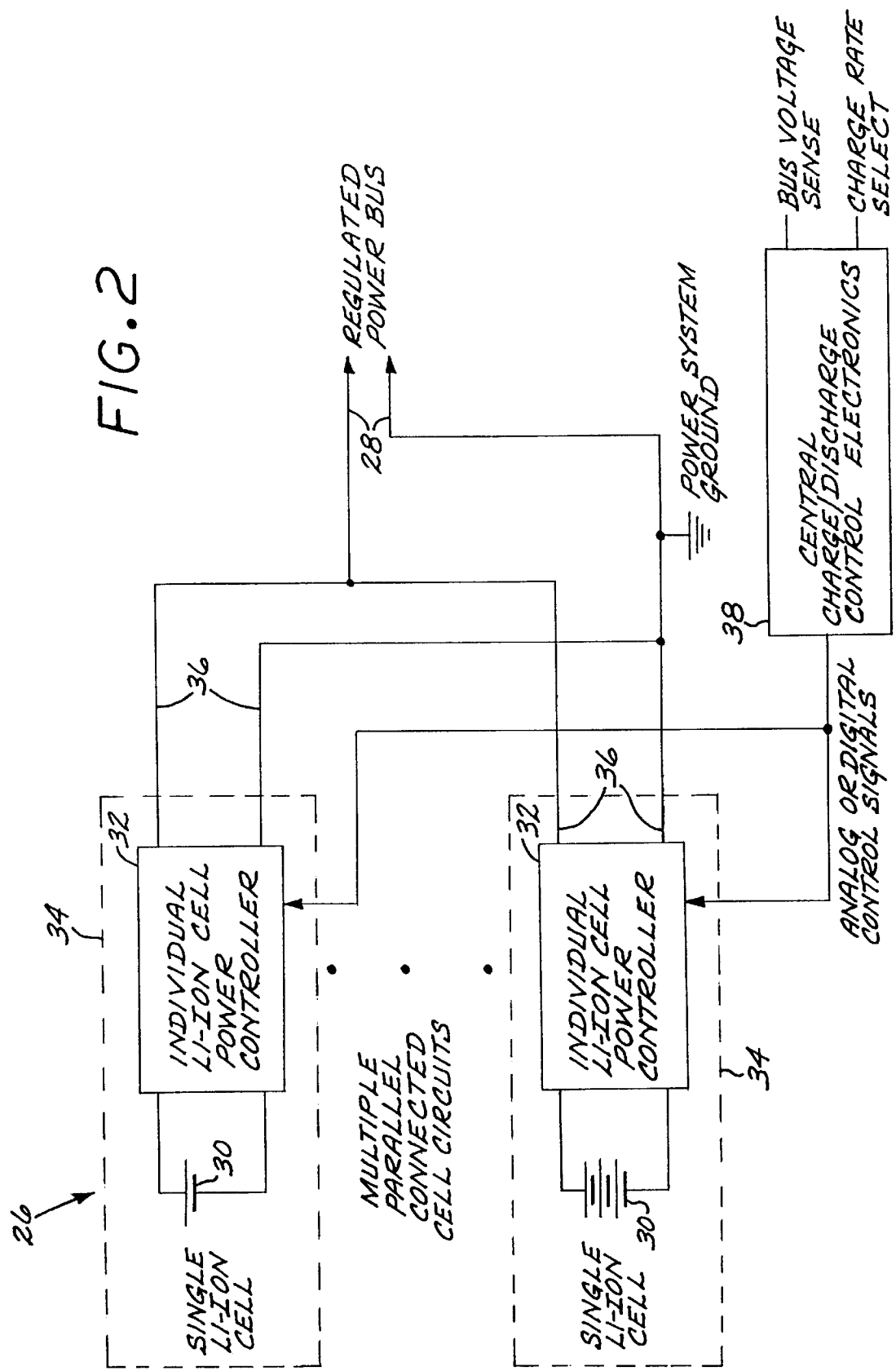
FIG. 2 is a schematic drawing of the battery cell modules and central controller.

FIG. 1 illustrates a power system 20 suitable for use in a spacecraft such as a geosynchronous communications satellite. The power system 20 includes an array of solar cells 22 that generate power, a solar array regulator 23 that controls the bus voltage during sunlight operation, and power-consuming components 24 that consume power. A power storage subsystem 26 stores excess power generated by the solar cells 22 for use in periods when the solar cells 22 do not generate power, as when the spacecraft is in shadow. The solar array regulator 23, power-consuming components 24, and power storage subsystem 26 are linked by a regulated power bus 28 that conveys power between the elements upon demand FIG. 2 illustrates the power-storage subsystem 26 in greater detail. The subsystem 26 includes at least two, and preferably a plurality of, battery cells, here illustrated as lithium-ion battery cells 30. The invention is operable with other types of battery cells as well, such as, for example, nickel-cadmium battery cells. The lithium-ion battery cells 30 may be of any operable type, and such battery cells are known in the art. An individual battery cell controller 32 is provide for each of the battery cells 30. Each battery cell controller 32 is operably connected to its respective lithium-ion battery cell 30 to control the charging and discharging of the lithium-ion battery cell 30. The battery cell controller 32 and its respective battery cell 30 together comprise a battery cell module 34. The power-storage subsystem 26 includes at least two, and preferably a plurality of, battery cell modules 34. Each of the battery cell controllers 32 has input/output leads 36 that convey energy to and from its battery cell 30. The input/output leads 36 of the individual battery cell controllers 32 may be electrically interconnected in any desired manner to provide a selected voltage and current, and in FIG. 2 they are illustrated as being interconnected in parallel and thence to the regulated power bus 28. In a preferred embodiment, one of the legs (typically the negative leg) of the input/output leads 36 is commonly grounded to a power system ground.

A central charge/discharge controller 38 is operably connected to each of the individual battery cell controllers 32. The central charge/discharge controller 38 provides commands to the individual battery cell controllers 32, including, for example, whether to charge or discharge, the charging rate and mode, and the charging and discharging rates. The controller 38 is typically a dedicated microprocessor or a sequence of instructions in a microprocessor that controls a wide range of spacecraft functions in addition to operation of the power-storage subsystem 26. The controller 38 may equivalently be an analog control device such as a dedicated circuit or interconnected discrete circuit elements.

Figure 3:
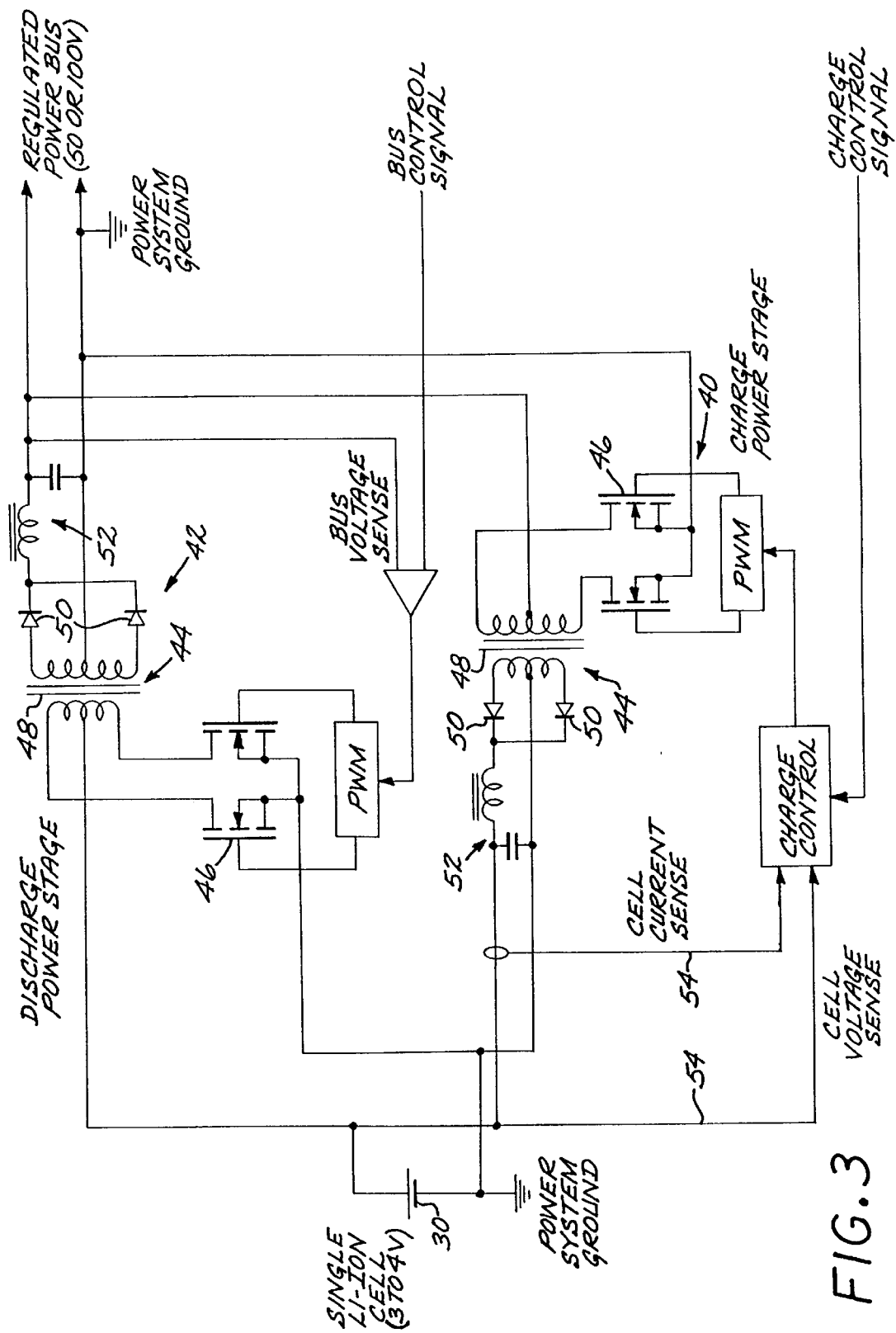
FIG. 3 is a schematic drawing of a first embodiment of one of the modules in greater detail.
Figure 4:
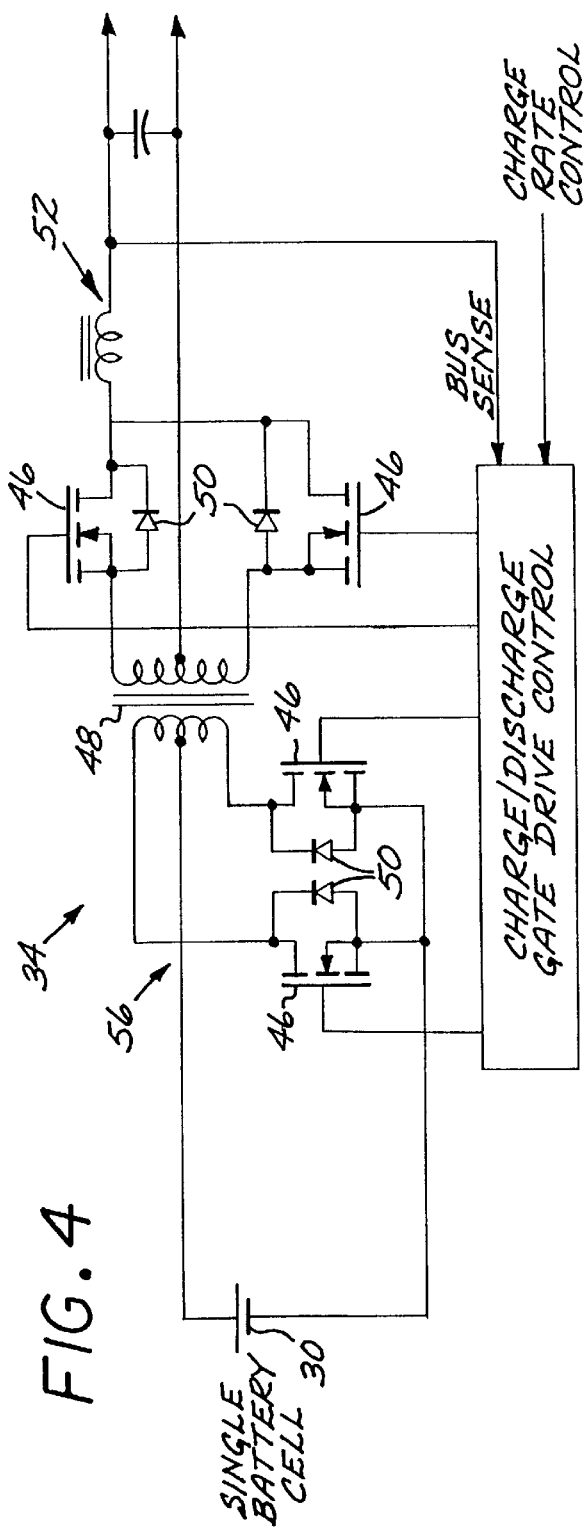
FIG. 4 is a schematic drawing of a second embodiment of one of the modules in greater detail.

FIGS. 3 and 4 illustrate two preferred embodiments of the structure of the battery cell module 34. The battery cell controller 32 includes the capability to control the charging and the discharging of its respective lithium-ion battery cell 30. In the embodiment of FIG. 3, two unidirectional dc-to-dc power converters 40 and 42 are utilized, the power converter 40 being connected to accomplish controllable charging of the lithium-ion battery cell 30 and the power converter 42 being connected to accomplish controllable discharging of the lithium-ion battery cell 30.

Each of the power converters 40, 42 is built around a transformer isolation buck converter 44. The transformer isolation buck converter 44 accomplishes a dc-to-dc voltage conversion: a step-down voltage conversion for the charging power converter 40 and a step-up (from the 3–4 volt output of the lithium-ion battery cell 30) voltage conversion for discharging power converter 42. In each case, the dc input to the transformer isolation buck converter 44 is processed through a MOSFET array 46 to create an ac voltage, which is provided to the primary of a transformer 48. The secondary of the transformer 48 is connected to a pair of diodes 50, whose connected outputs produce a pulse train that is passed through an LC circuit element 52 to produce a constant voltage dc signal.

During charging, the charging power converter 40 senses the voltage across and the current to the lithium-ion cell 30, numeral 54. This information is used to control the duty cycle of the MOSFET array 46, so as to accomplish a desired charging of the lithium-ion cell. For example, in most cases each battery cell 30 is charged until a preselected voltage is reached across the battery cell 30, and thereafter the preselected voltage is maintained and the battery cell 30 is charged with a decreasing current, the "taper charge" portion of the charging cycle. The charging power converter 40 is commanded from the central charge/discharge controller 38 to avoid overcharging of the battery cell 30. The use of a dedicated battery cell controller 32 for each lithium-ion battery cell 30 allows each cell to be individually monitored and charged to prevent overcharging.

During discharge, the bus control signal from the central charge/discharging controller 38 is compared to the bus voltage output of the discharging power converter 42 to control the duty cycle of the MOSFET array 46 to maintain a preselected output voltage on the bus 28 from each of the battery cell modules 34. Each discharging power converter 42 is thus commanded from the central charge/discharge controller 38 to avoid over-discharging of the battery cell 30. Over-discharging is avoided by reducing the discharge current when the cell voltage reaches a preset level, whereupon the battery cell controller 32 performs a taper discharge to avoid over-discharging the battery cell 30 while extracting maximum energy from the battery cell 30. The use of a dedicated battery cell controller 32 for each lithium-ion battery cell 30 allows each cell to be individually monitored and discharged to prevent over-discharging.

In the embodiment of FIG. 4, a single bidirectional dc-to-dc power converter 56 is utilized. The power converter 56 is connectable to accomplish controllable charging of the lithium-ion battery cell 30 and controllable discharging of the lithium-ion battery cell 30. The structure and operation of this bidirectional power converter 56 are similar to those of the two power converters 40 and 42, whose prior discussion is incorporated here, with provision for bidirectional operation.

Figure 5:
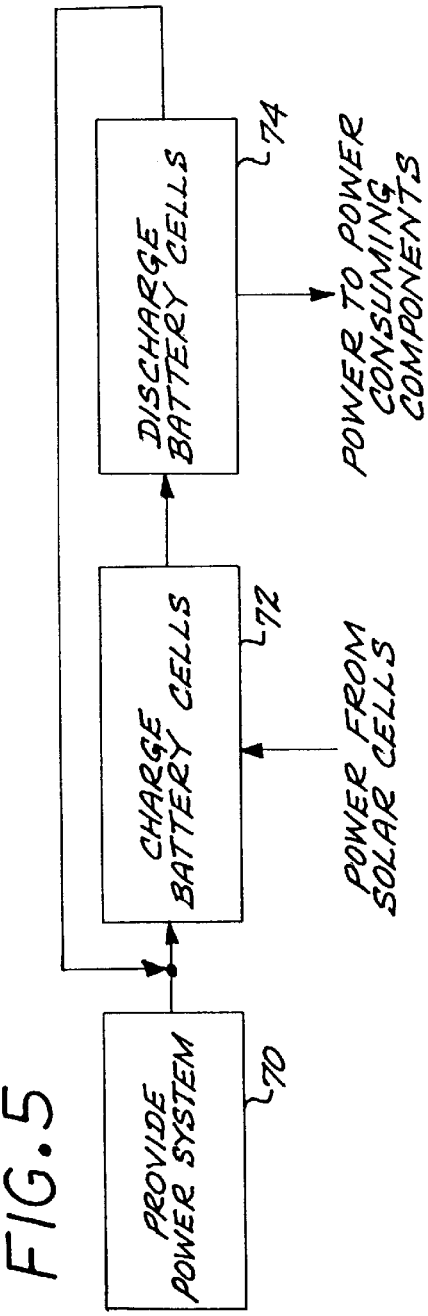
FIG. 5 is a block diagram of a method for practicing the invention.

FIG. 5 is a block flow diagram for a preferred approach to the operation of the power-storage subsystem 26. The power subsystem 26 as described previously is provided, numeral 70. Charging is accomplished as described previously using power from the regulated power bus 28 and generated by the solar cells 22 operating through the solar array regulator 23, numeral 72. Discharging is thereafter accomplished as described previously to provide power to the regulated power bus 28 and thence to the power-consuming components 24, numeral 74. This charging/discharging cycle is repeated.

Figure 6:
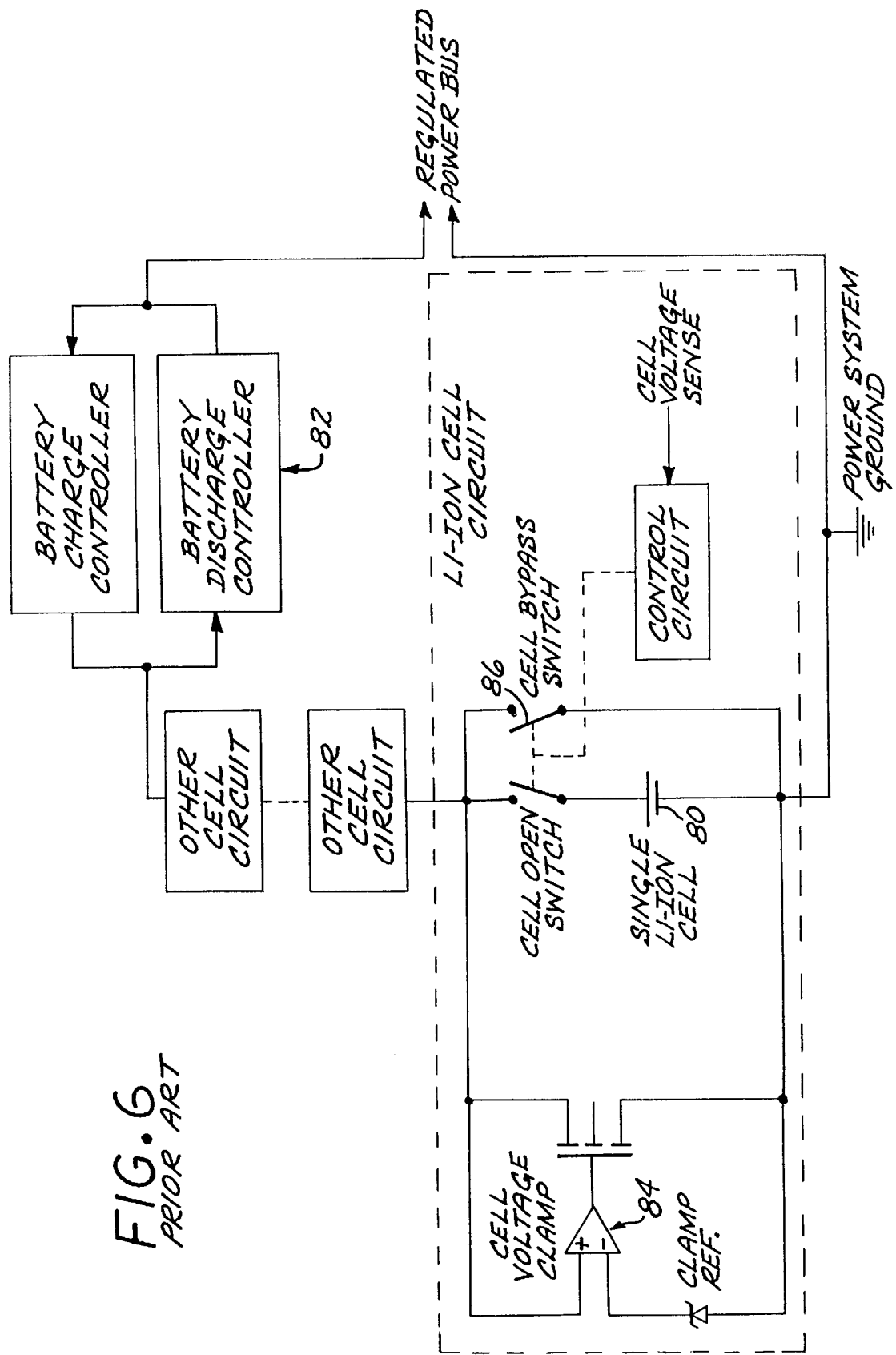
FIG. 6 is a schematic drawing of a prior approach.

FIG. 6 presents, for comparative purposes, a typical prior art approach for controlling an array of lithium-ion battery cells 80. A single charging/discharging controller set 82 is provided, and each battery cell 80 is clamped at a selected voltage by a clamping circuit 84 to accomplish the taper charge. A cell bypass switch 86 is provided around each of the battery cells 80. The present approach has the advantages, as compared with this prior art approach, that (1) no high-current power bypass switch 86 is required, (2) there is a savings in weight because the high-current cell bypass switch for each battery cell is heavy, (3) power dissipation is lower and thermal control is easier during charging because the clamping circuit 84 is not used, and (4) the maximum battery voltage is not limited by the output bus voltage.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A power system, comprising:
    at least two battery cell modules, each battery cell module comprising:
        a battery cell; and
        a battery cell controller operably connected to the battery cell to control the charging and discharging of the battery cell; and
    a central charge/discharge controller operably connected to each of the battery cell controllers of the at least two battery cell modules, wherein the central charge/discharge controller is operable to individually command the charging current and the discharging current of the battery cell modules.

2. The power system of claim 1, wherein each of the battery cell controllers comprises at least one dc-to-dc power converter.

3. The power system of claim 2, wherein the at least one dc-to-dc converter comprises one dc-to-dc bidirectional power converter.

4. The power system of claim 2, wherein the at least one dc-to-dc converter comprises two dc-to-dc unidirectional power converters.

5. The power system of claim 1, wherein each module has a power output, and wherein the power outputs of the at least two battery cell modules are electrically connected in parallel.

6. The power system of claim 1, wherein each module has a negative-polarity power output and a positive-polarity power output, and wherein the negative-polarity power output is electrically connected to a system ground.

7. The power system of claim 1, wherein the power system further includes
    a power bus to which each of the battery cell controllers is operably connected;
    a power source controllably connected to the power bus; and
    a power-consuming device controllably connected to the power bus.

8. The power system of claim 1, wherein each battery cell is a lithium-ion battery cell.

9. A method for supplying power, comprising the steps of providing at least two battery cell modules, each battery cell module comprising:
    a lithium-ion battery cell; and
    a battery cell controller operably connected to the lithium-ion battery cell to control the charging and discharging of the lithium-ion battery cell;
    providing a central charge/discharge controller operably connected to each of the battery cell controllers of the at least two battery cell modules;
    individually charging each battery cell through its respective battery cell controller at a controlled current until a preselected voltage is reached across the battery cell, and thereafter maintaining the preselected voltage and continuing to charge the battery cell with a decreasing current; and thereafter
    individually discharging each battery cell through its respective battery cell controller at a controlled output voltage until a preselected cell voltage is reached across the cell, and thereafter maintaining the preselected cell voltage and continuing to discharge the battery cell with a decreasing current.

10. The method of claim 9, wherein each of the battery cell controllers comprises
    at least one dc-to-dc power converter.

11. The method of claim 10, wherein the at least one dc-to-dc converter comprises one dc-to-dc bidirectional power converter.

12. The method of claim 10, wherein the at least one dc-to-dc converter comprises two dc-to-dc unidirectional power converters.

13. The method of claim 9, wherein each module has a power output, and wherein the power outputs of the at least two battery cell modules are electrically connected in parallel.

14. The method of claim 9, wherein each module has a negative-polarity power output and a positive-polarity power output, and wherein, the negative-polarity power output is electrically connected to a system ground.

15. The method of claim 9, wherein the power system further includes
    a power bus to which each of the battery cell controllers is operably connected;
    a power source controllably connected to the power bus; and
    a power-consuming device controllably connected to the power bus.

16. The method of claim 9, wherein the step of discharging discontinuing the discharging of one of the battery cells while continuing the discharging of the remaining battery cells.

17. The power system of claim 1, wherein the central charge/discharge controller is operable to
    individually charge each battery cell through its respective battery cell controller at a controlled current until a preselected voltage is reached across the battery cell, and thereafter maintain the preselected voltage and continue to charge the battery cell with a decreasing current, and thereafter
    individually discharge each battery cell through its respective battery cell controller at a controlled output voltage until a preselected cell voltage is reached across the cell, and thereafter maintain the preselected cell voltage and continue to discharge the battery cell with a decreasing current.

18. A power system, comprising:
- at least two battery cell modules, each battery cell module comprising:
  - a battery cell; and
  - a battery cell controller operably connected to the battery cell to control the charging and discharging of the battery cell, wherein each of the battery cell controllers comprises at least one dc-to-dc power converter including a transformer isolation buck converter; and
- a central charge/discharge controller operably connected to each of the battery cell controllers of the at least two battery cell modules.

19. The power system of claim 18, wherein the at least one dc-to-dc converter comprises one dc-to-dc bidirectional power converter.

20. The power system of claim 18, wherein the at least one dc-to-dc converter comprises two dc-to-dc unidirectional power converters.

21. The power system of claim 18, wherein the central charge/discharge controller is operable to individually control the charging and the discharging of each battery.

22. A power system, comprising:
- at least two battery cell modules, each battery cell module comprising:
  - a battery cell; and
  - a battery cell controller operably connected to the battery cell to control the charging and discharging of the battery cell; and
- a central charge/discharge controller operably connected to each of the battery cell controllers of the at least two battery cell modules, wherein the central charge/discharge controller is operable to protect the battery cell modules against overcharging and overdischarging.

* * * * *